United States Patent [19]

Gutleber

[11] Patent Number: 4,638,318

[45] Date of Patent: Jan. 20, 1987

[54] SMALL ANGULAR BEAMWIDTH ANTENNA SYSTEM

[75] Inventor: Frank S. Gutleber, Little Silver, N.J.

[73] Assignee: The United States of America as represented by the Secretary of the Army, Washington, D.C.

[21] Appl. No.: 526,735

[22] Filed: Aug. 26, 1983

[51] Int. Cl.[4] ...................... H04B 15/00; H01Q 25/00

[52] U.S. Cl. .................................... 342/383; 342/384; 342/367

[58] Field of Search .............. 343/18 E, 5 CE, 12 SB, 343/381, 384, 371, 372, 417, 421, 367, 383

[56] References Cited

U.S. PATENT DOCUMENTS 3,435,453 3/1969 Howard ............................. 343/383

4,516,126 5/1985 Masak et al. ........................ 343/384

FOREIGN PATENT DOCUMENTS 1129086 8/1982 Canada .

*Primary Examiner*—T. H. Tubbesing

*Assistant Examiner*—Gilberto Barrón, Jr.

*Attorney, Agent, or Firm*—Sheldon Kanars; Jeremiah G. Murray; Edward Goldberg

[57] ABSTRACT

A relatively narrow beamwidth (10° or less) receiving antenna pattern is formed at the receiver end of a radio frequency transmission link where a plurality of radiating sources are operating in a dense communications environment. The antenna pattern comprises the difference between two antenna receiving patterns where the beamwidth of one pattern is wider by a predetermined angular amount than the other pattern. In the preferred embodiment, a phased linear array of antenna elements is operated as two sets of elements wherein one set of elements comprising a number of elements less than the total number of elements provides a beamwidth that is broadened by a predetermined angular sector greater than the beamwidth formed by the entire array. The antenna elements are progressively phase shifted to provide overlapping beam patterns and the pattern of one set of elements is scanned so that one side of both patterns are substantially coincident. The received signals from the elements developing the two antenna patterns are respectively combined and linearly subtracted to provide cancellation of all the received radiation except over the small angular sector defined by the difference between the two patterns.

9 Claims, 4 Drawing Figures

SMALL ANGULAR BEAMWIDTH ANTENNA SYSTEM

The invention described herein may be manufactured, used and licensed by or for the Government for governmental purposes without the payment of any royalties thereon or therefor.

FIELD OF THE INVENTION

This invention relates generally to communications systems and more particularly to radio frequency communications trunk transmission systems in which antenna pattern cancellation arrangements are utilized to automatically eliminate or reduce external interference at the receiving end of the transmission communications link.

BACKGROUND OF THE INVENTION

As is well known and understood, one of the major concerns of designers of antenna system trunk transmission communications links is the elimination or reduction of external interference sources such as jamming and self-interference in a dense communications environment. Also as is well known, the beamwidth of the antenna is constrained by the allowable physical size of its aperture and most arrangements which attempt to resolve the problems of external interference do so in a relatively complex manner, often utilizing very large directional antennas or with antennas having hundreds or more elements to reduce the received beamwidth.

Mobility requirements and cost restrictions generally prevent utilizing an antenna size that provides a beamwidth of less than one degree in present state of the art transmission systems.

Accordingly, it is an object of the present invention to eliminate external interference at the receiving end of a transmission link.

Another object of the invention is to provide an interference cancelling receiving antenna system operating in a dense communications environment.

Still a further object of the invention is to provide a receiving antenna system having a relatively very narrow beamwidth for eliminating or reducing external interference from undesired signal sources.

SUMMARY OF THE INVENTION

These and other objects are achieved by means of an interference cancelling system affording an operation which simulates that of a very narrow beam directional antenna in eliminating or reducing external interference sources. It comprises antenna elements providing two overlapping receiver beam patterns of 10° or less where one antenna beamwidth pattern is wider by a relatively very small beamwidth segment than the other antenna pattern beamwidth and which is scanned slightly in order to line up the two patterns on one side. The received signals from the two beamwidth patterns are subtracted from one another, thus cancelling all the signals arriving from any direction except over the incremental angular segment. In the preferred embodiment, a phased linear array of antenna elements are operated as two sets of receiving antenna elements which are progressively phase shifted to provide one pattern having a beamwidth which is broadened by a predetermined incremental angular sector relative to the other pattern and scanned so that the two beam patterns substantially line up on one side. The RF signals received by the two sets of elements are respectively combined with the output of the combiner for the broadened beam being linearly subtracted from the combiner for the other beam to provide a cancellation of interference from all directions except over a small incremental angular sector where the patterns are not overlapping.

DESCRIPTION OF THE PREFERRED EMBODIMENT

Figure 1:
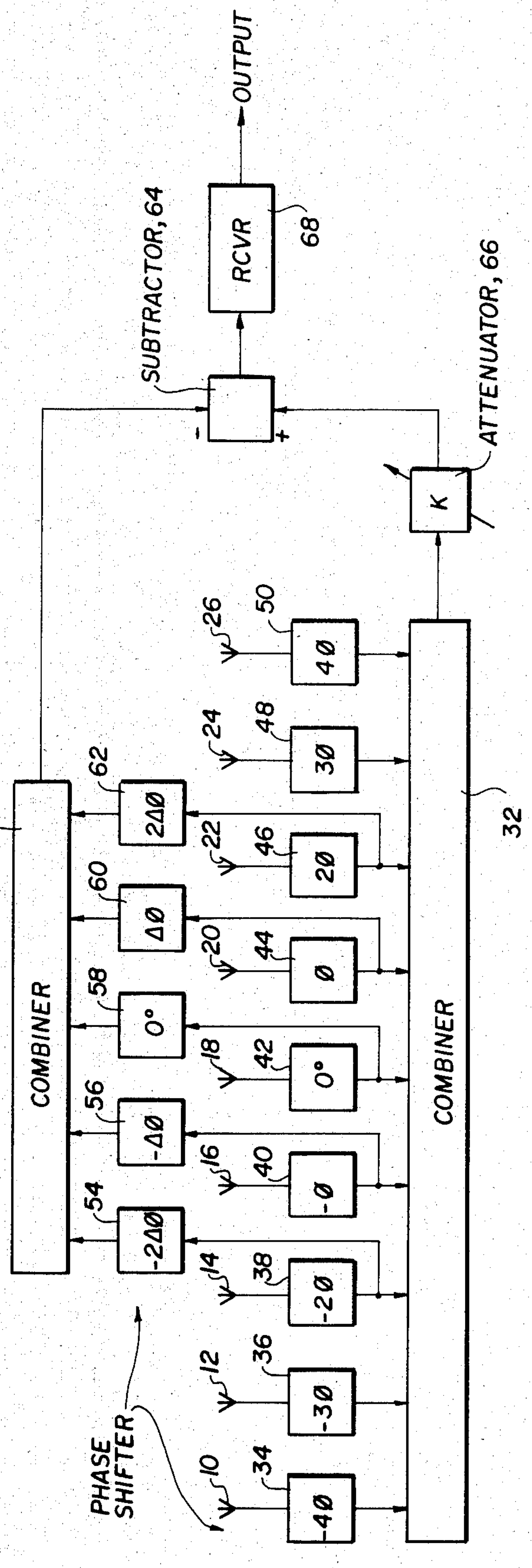
FIG. 1 is a functional block diagram illustrative of the preferred embodiment of a receiving antenna system in accordance with the principles of the subject invention.

Referring now to the drawings and more particularly to FIG. 1, shown therein is an interference cancelling receiving antenna arrangement particularly adapted for use in tactical mobile trunk transmission systems such as a line of sight transmission link operating in a dense communications environment where severe jamming is encountered and where such systems typically operate in the UHF and SHF frequency bands or in a surveillance system which requires extremely small angular resolution such as a beamwidth of less than one degree.

Figure 2:
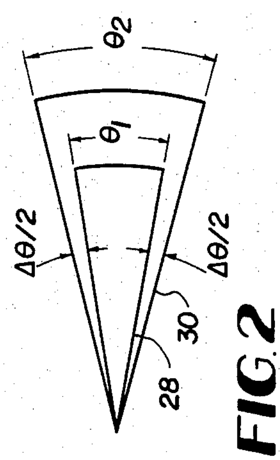
FIG. 2 is a diagram illustrative of the receiving antenna beam patterns formed by the antenna elements shown in FIG. 1.

The preferred embodiment of the invention as shown in FIG. 1 takes the form of a linear phased array of receiving elements comprised of, for example, nine antenna elements 10, 12, 14 . . . 26. As is well known, the size of the aperture or received pattern beamwidth is a function of the number of elements in the array, with the beamwidth of the pattern being reduced as the number of elements increases. In the subject invention, the linear array is operated to provide two receiver antenna beam patterns by utilizing all of the elements 10 through 26 for generating a first beam pattern 28 having an angular beamwidth $\theta_1$, as shown in FIG. 2, while a selected number, for example, five of the inner elements 14, 16, 18, 20 and 22 are operated to generate a second pattern 30 having an angular beamwidth of $\theta_2$ and which is broader than the beamwidth $\theta_1$ by a predetermined angle $\Delta\theta$. The beamwidth of the larger angular segment $\theta_2$ is designed to be in the range of 0° to 10°.

Further as shown in FIG. 1, the antenna elements 10 through 26 are coupled as a first set of elements to a first signal combiner 32 by phase shifting means 34, 36, 38 . . . 50 while the inner elements 14 through 22 which form the larger beam pattern are coupled as a second set of elements to a second signal combiner 52 through respective phase shifting means 54, 56, . . . 62 coupled to outputs of the phase shifters 38 through 46. The phase shifters 34 through 50 provide phase shifts in multiples of $\phi$ on either side of the center element 18. Thus the phase shifters 40, 38, 36 and 34 provide respective phase shifts of $-\phi$, $-2\phi$, $-3\phi$ and $-4\phi$, whereas phase shifters 44, 46, 48 and 50 provide phase shifts of $\phi$, $2\phi$, $3\phi$ and $4\phi$. The phase shifters 54 through 62 provide additional phase shifts in multiples of $\Delta\phi$ on either side of the center element 18. As shown, the phase shifters 56 and 54 provide phase shifts of $-\Delta\phi$ and $-2\ \Delta\phi$, respectively whereas the phase shifters on the right side of the center element, namely, the phase shifters 60 and 62 provide phase shifts of $\Delta\phi$ and $2\Delta\phi$, respectively.

Figure 3:
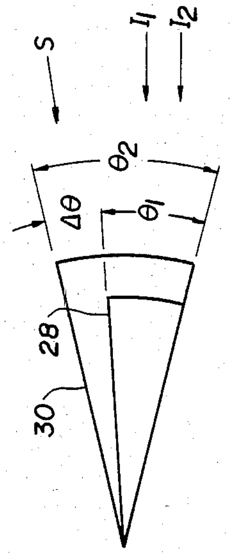
FIG. 3 is a diagram illustrative of the operation of the subject invention for receiving a desired signal while eliminating undesired external interference signals.

The progressive additional phase shifts provided in the inner elements by phase shifters 54 through 62 result in a beamwidth of the pattern 30 for the second or inner set of antenna elements 14 through 22 which is broadened by $\Delta\theta$ and scanned by $\Delta\phi/2$ relative to the beam pattern 28 formed by all of the elements 10 through 26 of the antenna array, which results in the two received patterns 28 and 30 being aligned as shown in FIG. 3 The phase shifters 34, 36 . . . 50, act to electronically scan the composite beamwidth pattern.

Again, referring to FIG. 1, the output of the combiner 52 for the broadened beam $\theta_2$ of pattern 30 is linearly subtracted from the output of the combiner 32 for the narrower beam $\theta_1$ of pattern 28 by means of a subtractor 64 which provides a cancellation in the main beam, for example, signals $I_1$ and $I_2$ shown in FIG. 3 from all directions except over the small angular sector $\Delta\phi$ where the desired signal S is incident thereto. Since some adjustment of the amplitude of the original beam pattern is necessary to account for amplitude differences between the output of the combiners 32 and 52 which results from slight differences in antenna gain, the embodiment of FIG. 1 additionally discloses a variable attenuator 66 in the signal path between the combiner 32 and the linear subtractor 64. Further as shown, the output of the subtractor 64 is fed to radio receiver apparatus 68 which is operable to demodulate the RF signals resulting from the differencing of the RF signals received by the first and second sets of antenna elements.

Figure 4:
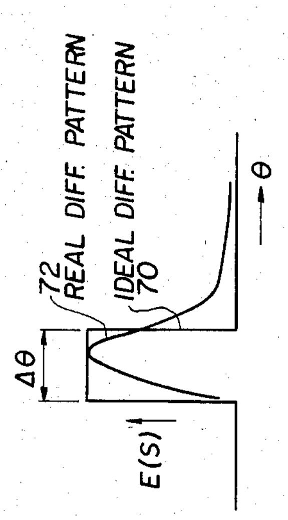
FIG. 4 is a diagram further helpful in understanding the principles of the invention.

FIG. 4 is intended to show that whereas an ideal difference pattern designated by reference numeral 70 would tend to have well defined steep sides at the edges of the angular sector $\Delta\phi$, however, in reality an actual or real difference pattern would resemble the characteristic designated by reference numeral 72.

Further by rotating the entire antenna array or electronically scanning it, it is possible to direct the beam sector $\Delta\phi$ to any specific signal source while virtually eliminating all undesired signals without requiring any complex adaptive processing or requiring a very large complex very narrow beam antenna. Thus a relatively very narrow pencil beamwidth antenna system results which eliminates multiple interference in the main beam except over the angular sector $\Delta\theta$ and which is realized with practical hardware.

Whereas the preferred embodiment of FIG. 1 is described with respect to a linear array, it should be understood that, when desirable, a planar array may be utilized to provide a two dimensional receive antenna pattern having a very high degree of angle of resolution in both azimuth and elevation. Additionally, it is also within the scope of the present invention to employ a lens or parabolic dish antenna, when desired, with a separate displaced feed to form the additional scanned beam having a different illumination pattern displaced with the other antenna feed to broaden its beamwidth pattern.

Having thus shown and described what is considered at present to be the preferred embodiment of the present invention, it will be readily apparent that modifications may be resorted to by those skilled in the art without departing from the spirit and scope of the invention. Accordingly, all alterations, changes and modifications coming within the scope of the invention as set forth in the appended claims are herein meant to be included.

I claim:

1. A narrow beamwidth radio frequency antenna system for eliminating undesired interference signals at the receiver end of communications trunk transmission links operating in a dense communications environment comprising:

a first receiving antenna including a first phased linear array of a first number of like antenna elements progressively phase shifted in predetermined incremental steps of a first angle to provide a first relatively narrow beamwidth directive antenna pattern providing reception of signals in a predetermined narrow angular sector corresponsing to said first pattern;

a second receiving antenna including a second phased linear array of a second smaller number of like antenna elements progressively phase shifted in predetermined incremental steps of a second larger angle to provide a second relatively narrow beamwidth directive antenna pattern providing reception of signals in a narrow angular sector corresponding to said second pattern greater than said first antenna pattern;

means for scanning said antenna patterns such that said patterns overlap with one side thereof being substantially mutually coincident providing a single small incremental angular sector between the other sides of said first narrow sector and greater second sector where said antenna patterns do not overlap;

first means for combining signals from said first number of antenna elements and first phase shifted angle;

second means for combining signals from said second number of antenna elements and second phase shifted angle; and means for subtracting signals from said first and second combining means providing signal cancellation of substantially all signals arriving at said overlapping antenna patterns and having only the remaining single incremental antenna pattern angular sector for receiving signals.

2. The antenna system of claim 1 wherein said first and second receiving antenna have a beamwidth for reception of substantially between 1° and 10°.

3. The antenna system of claim 1 wherein said first and second receiving antennas include antenna elements of a common array, said second antenna including selected elements of said first number of antenna elements less than all of said elements.

4. The antenna system of claim 3 wherein said second number of antenna elements are centrally located elements of said array.

5. The antenna system of claim 4 wherein said means for scanning said beam patterns includes means for scanning the beam pattern of said second antenna means relative to the beam pattern of said first antenna means.

6. The antenna system as defined by claim 5 and wherein said means for scanning said beam patterns include respective first phase shifter means coupled between the antenna elements of said first antenna means and said first signal combiner means, and respective second phase shifter means coupled between respective said first phase shifter means coupled to said antenna elements of said first antenna means common to said second antenna means and said second signal combiner means.

7. The antenna system as defined by claim 6 wherein said first phase shifter means provide angular phase shifts of signals coupled to said first combiner means in multiples of said angular sector of said first receiving antenna and wherein said second phase shifter means provide angular phase shifts of signals coupled to said second combiner means in multiples of said incremental angular sector between said beam patterns.

8. The antenna system as defined by claim 7 wherein said angular phase shifts of said first and second phase shifter means progressively increase and decrease on either side of the center element of said array.

9. The antenna system of claim 3 wherein said first phase shifter means provide angular phase shifts of signals coupled to said first combiner means in multiples of the required phase shift which will electronically scan the composite beam pattern so as to point the non-overlapping region of the two antenna patterns in the direction of the desired signal and wherein said second phase shifter means provide angular phase of signals coupled to said second combiner means in multiples of the required incremental phase shift so as to scan the beam pattern of said second antenna by a predeterminded space angle to line up the two antenna patterns on one common side.

* * * * *